Aug. 30, 1955
D. S. KELLOGG ET AL
2,716,520
SALE PRICE COMPUTING MECHANISM
Filed Jan. 18, 1950
8 Sheets-Sheet 1
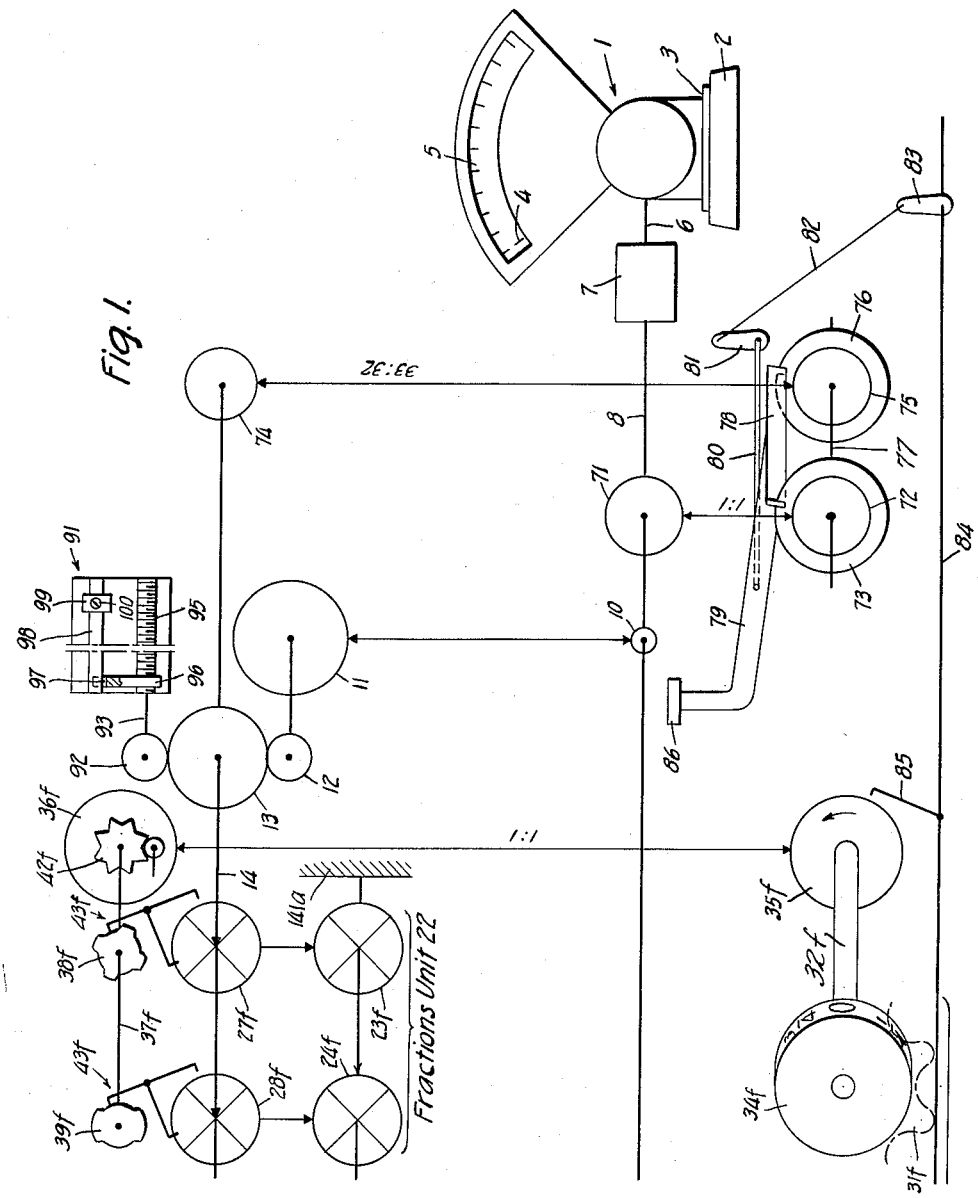
INVENTORS
Donald S. Kellogg
Russell Walker
BY Moore, Nolte, Crews & Berry
ATTORNEYS

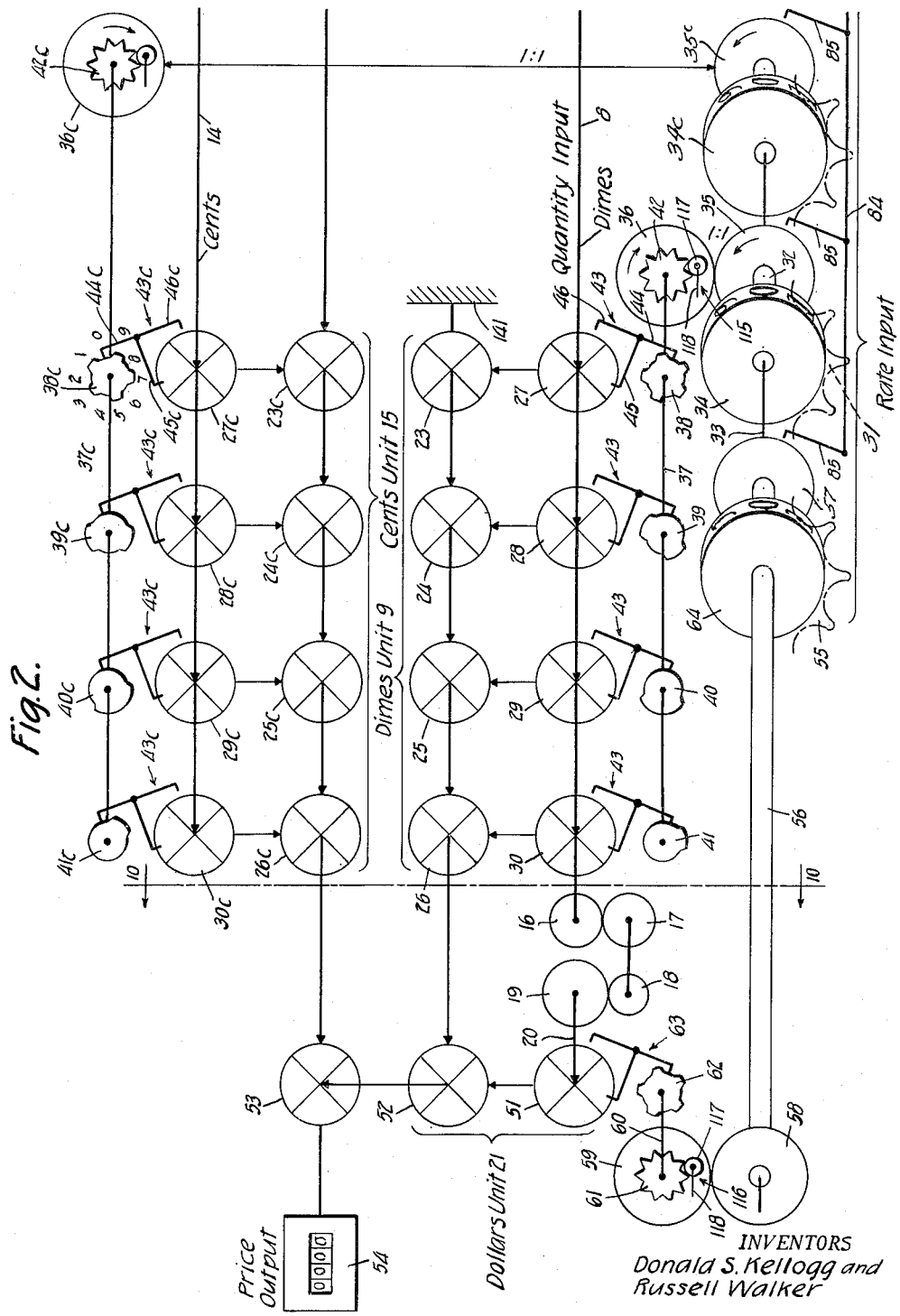

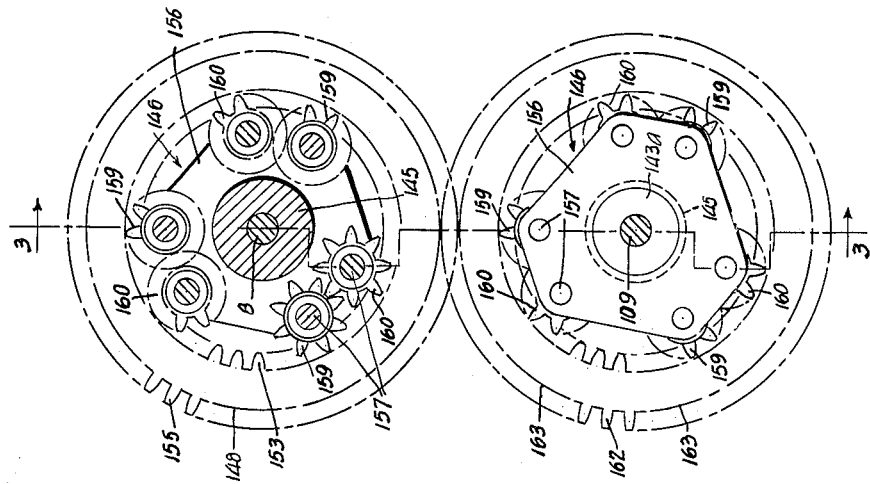
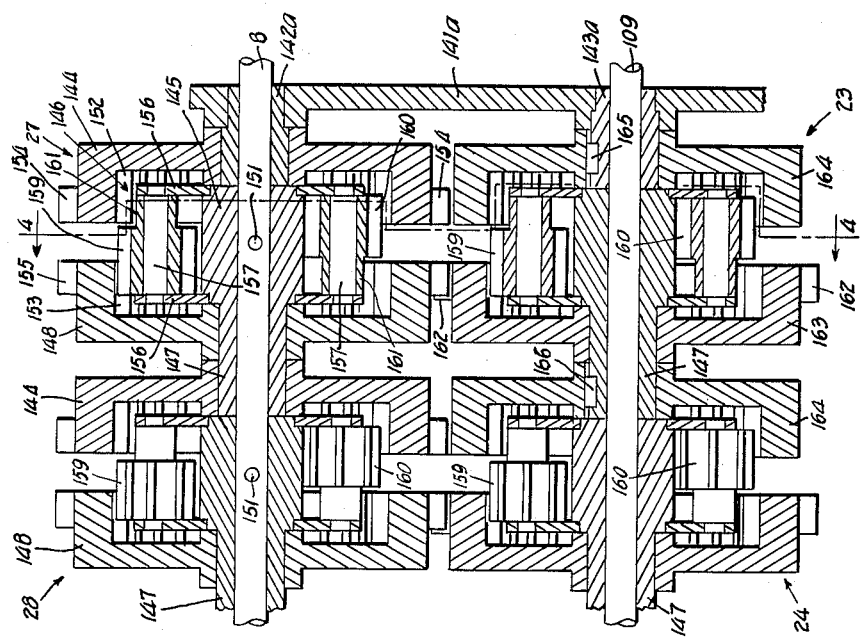

Aug. 30, 1955
D. S. KELLOGG ET AL
2,716,520
SALE PRICE COMPUTING MECHANISM
Filed Jan. 18, 1950
8 Sheets-Sheet 4
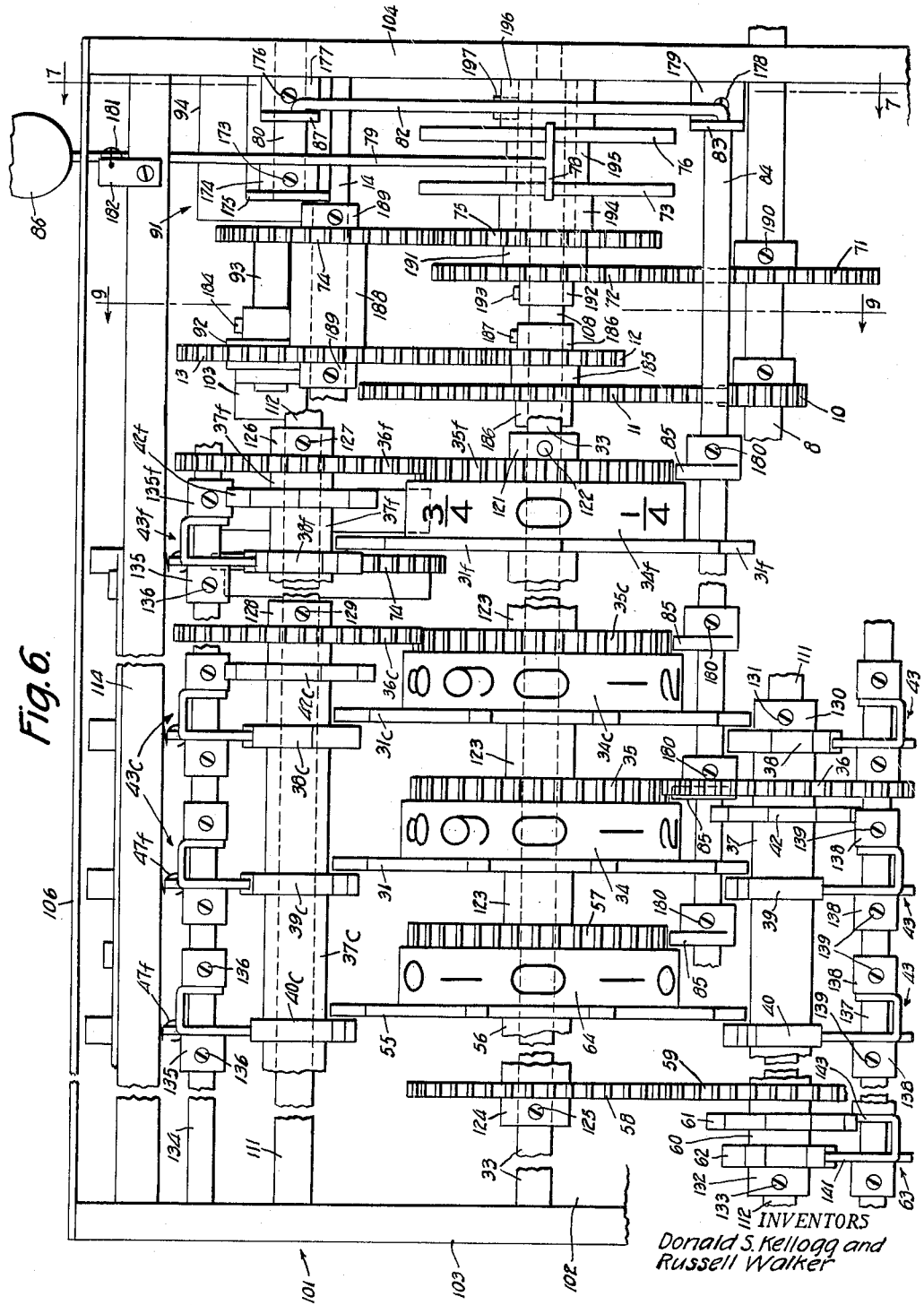
INVENTORS
Donald S. Kellogg and
Russell Walker
BY Moses, Nolte, Crews, + Berry
ATTORNEYS Aug. 30, 1955     D. S. KELLOGG ET AL     2,716,520
SALE PRICE COMPUTING MECHANISM Filed Jan. 18, 1950     8 Sheets-Sheet 6

*Fig.8.*

INVENTORS
Donald S. Kellogg and
Russell Walker

BY Moses, Nolte, Crews + Berry
ATTORNEYS

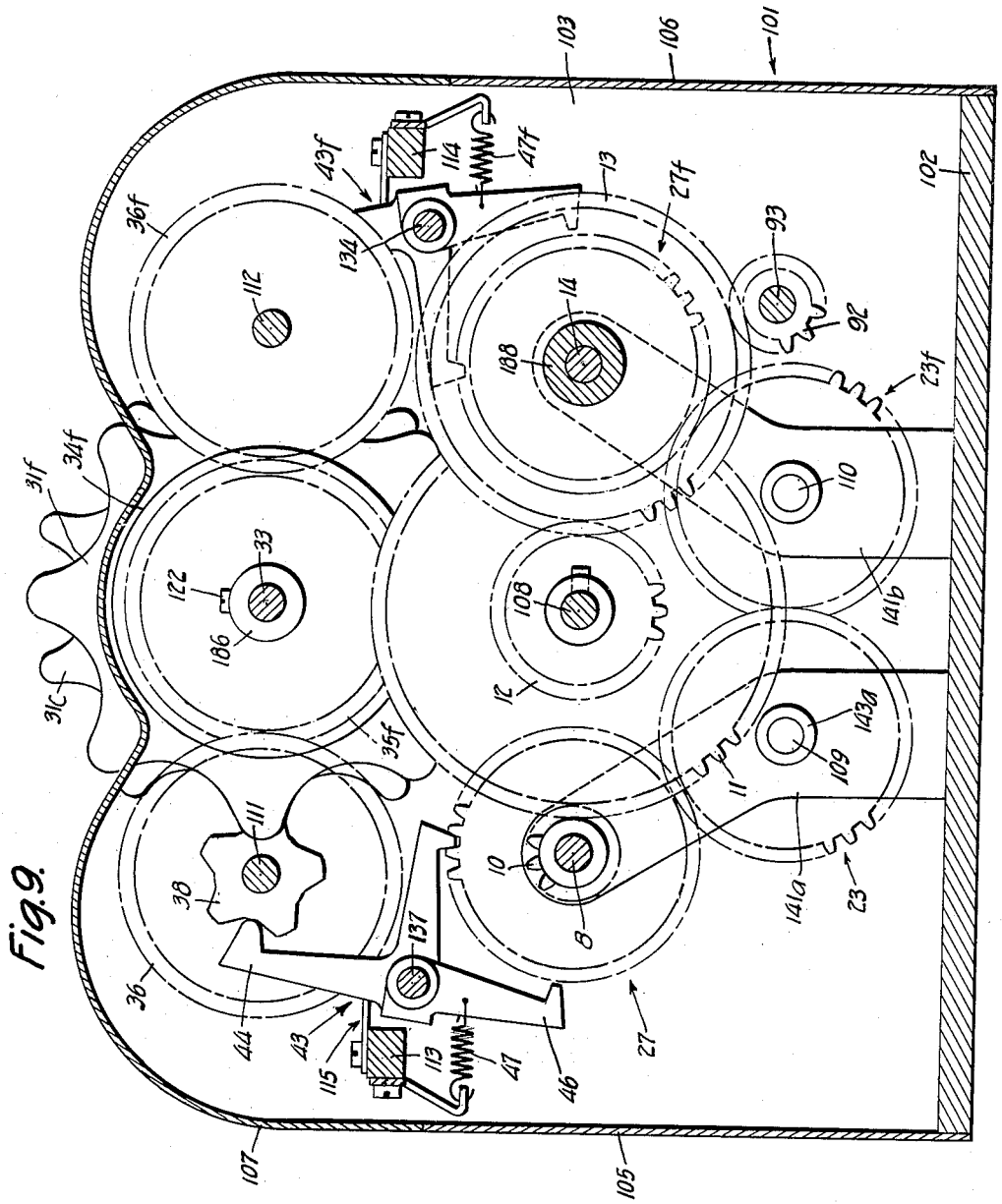

Aug. 30, 1955    D. S. KELLOGG ET AL    2,716,520
SALE PRICE COMPUTING MECHANISM
Filed Jan. 18, 1950    8 Sheets-Sheet 8
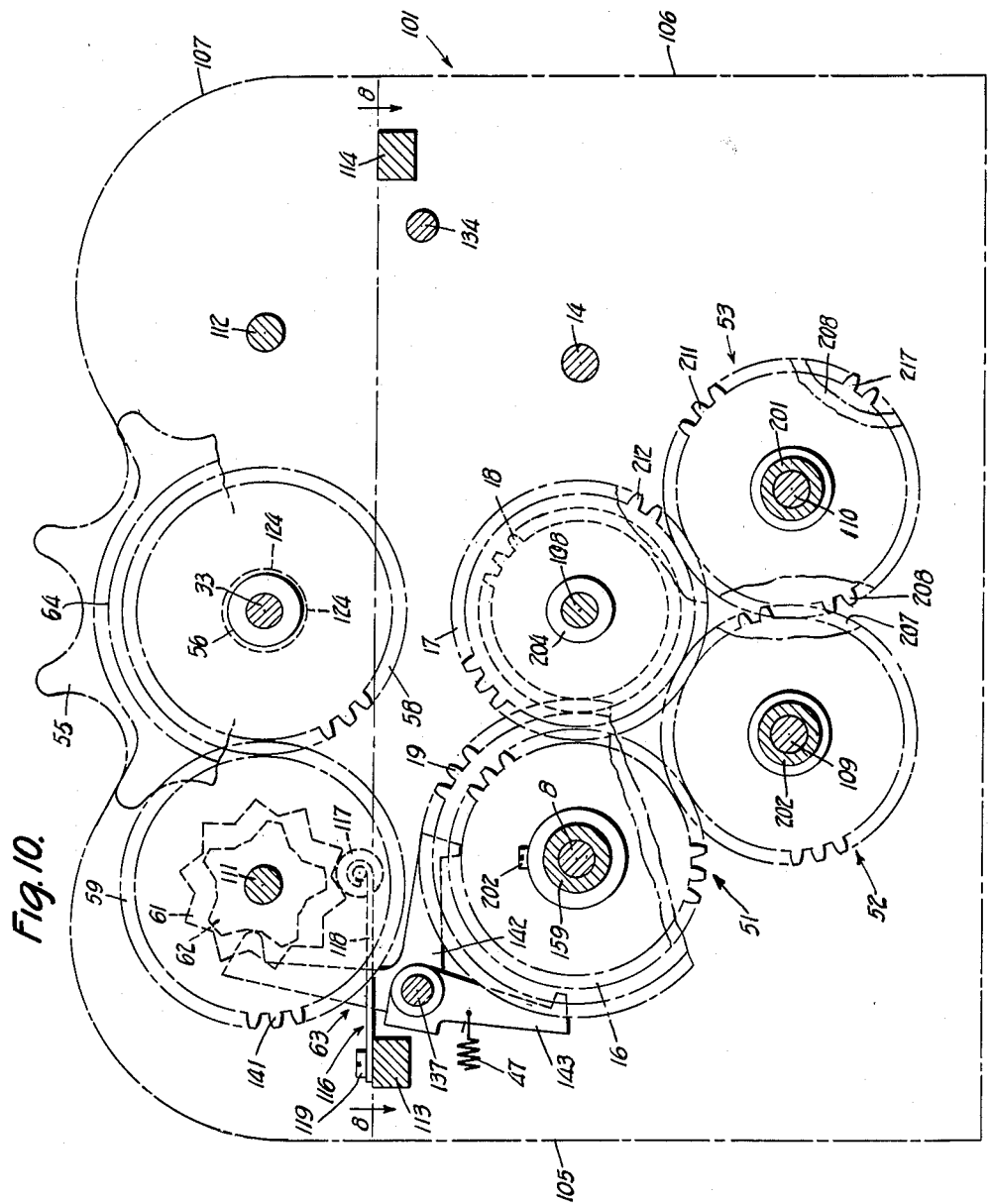
INVENTORS
Donald S. Kellogg and
Russell Walker
BY Moses, Nolte, Crews & Berry
ATTORNEYS

United States Patent Office 2,716,520
Patented Aug. 30, 1955

2,716,520

SALE PRICE COMPUTING MECHANISM

Donald S. Kellogg, Great Neck, N. Y., and Russell Walker, Nutley, N. J., assignors to The W. L. Maxson Corporation, New York, N. Y., a corporation of New York Application January 18, 1950, Serial No. 139,204

14 Claims. (Cl. 235—61)

This invention relates to multiplying mechanism, and, more particularly to multiplying mechanism which is automatically actuated to compute and exhibit the price of a merchandise order as an incident of the weighing or other measuring of the quantity of merchandise.

In certain aspects the present invention is in the nature of an improvement upon the invention disclosed and claimed in Letters Patent of the United States # 2,177,611, granted to Peter J. McLaren on October 24, 1939, for Variable Speed Mechanism.

In the patent referred to a series of like differential gears is provided, the gears being mounted coaxially upon a common shaft. Each differential includes a primary input gear arranged to be individually coupled to and uncoupled from a common input or operating shaft and to be locked against operation when uncoupled. Each differential gear other than the last in the series includes an output gear through which it transmits its entire input, divided by 2, to a secondary input gear of the next differential higher in series. By coupling the differential gears to the common input shaft individually and in combination, it is possible to provide any whole number multiplicand from 1 through $2^n-1$ where $n$ is the number of computing differential gears employed. Any fixed multiplicand factor $k$, either a whole number or a fraction, can also be provided, of course, through the employment of fixed gearing in the transmission train.

Multiplicand setting mechanism is provided for setting up the available multiplicands in numerical order from the one of lowest value to the one of highest value. The series may be a continuous arithmetical series or an interrupted one, but in any case the order from beginning to end is invariable.

Multiplying apparatus of the kind referred to is suitable and highly practical for some purposes, as in a metering gasoline pump, where the only vendible commodity is gasoline and the price per gallon (multiplicand) remains the same for days and weeks on end, but the type of multiplicand setting mechanism referred to is not at all suitable in a computing scale where the commodity and the price per pound of the commodity is likely to change with each sale.

It is accordingly an object of the present invention to utilize the principle of the multiplying mechanism of Patent # 2,177,611 while modifying such mechanism to provide decimal denomination groups of differential gears together with multiplicand setting mechanism which includes independently operable decimal denomination digit selectors. With this improvement the multiplicand can be set up as quickly as the digits can be run independently into the several multiplicand indicating number wheels.

It is a further important object to provide for optionally increasing the multiplicand by such common fractions as ¼, ½ and ¾, and to provide an independently operable selector for setting up such fractional increments of the multiplicand.

It is important that the price indicator reads zero whenever the weight or quantity indicator reads zero, since otherwise the price indicator reading will not be a true product of the price per unit and the number of units. To this end it is an important feature that interlocking mechanism is provided for locking the multiplicand setting mechanism at all times when the multiplier input member is displaced from the zero position, and for locking the multiplier input member in the zero position while leaving the multiplicand setting mechanism free to be set.

In order that the multiplicand input member shall be locked in the zero position and no other, it is a feature that limit stop mechanism is provided for determining the operative range, and that notched locking disks are driven from the multiplier input member at such incommensurable rates that the notches, which are aligned in locking position at zero, cannot again be aligned in that position within the operative range of the machine.

In Patent #2,177,611 each differential gear is coupled to and uncoupled from the input member by the shifting of a coupling gear between coupling and uncoupling positions. The coupling gear is shifted in an arc concentric with the differential axis and remains in mesh with the differential primary input gear at all times. In coupling position, the coupling gear is in mesh with a gear fast on the input shaft and is free to transmit motion to the primary input gear of the differential. In uncoupling position the coupling gear is disengaged from the input gear and engaged with a locking finger. The locking finger holds the coupling gear against rotation, and hence locks the primary input gear of the differential with which it is engaged. This mode of operation has the drawback that the shifting of the coupling gear produces a slight rotation of the primary differential input gear, thus introducing an inaccuracy.

It is an object of the present invention to overcome this difficulty through means capable of coupling and uncoupling the computing differentials without shifting gears into and out of mesh with one another. To this end coupling differentials are provided, each having a constantly driven input, a constantly connected transmitting output, and a waste output. The transmitting and waste outputs are adapted to be alternatively locked and unlocked.

Other objects and advantages will hereinafter appear.

In the drawing forming part of this specification:

Figs. 1 and 2 are complementary diagrammatic views which, when placed end to end, illustrate the principle and general organization of the machine.

Fig. 3 is a view in sectional elevation taken upon the line 3—3 of Fig. 4 looking in the direction of the arrows, the view illustrating the structure and relative disposition of the first two coupling differentials and the first two computing differentials of the dimes unit;

Fig. 4 is a sectional view taken upon the line 4—4 of Fig. 3 looking in the direction of the arrows;

Fig. 5 is a detail view showing the spider disks of one of the differential gears and a pair of overlapped and intermeshed planet gears carried by the spider;

Fig. 6 is a fragmentary plan view of the machine broken away at a number of points for compactness of illustration, the view being taken looking down on the machine with the cover removed but omitting for the sake of clearness a number of parts which would actually appear in the background;

Fig. 8 is a sectional view taken upon the line 8—8 of Fig. 10 looking in the direction of the arrows;

Fig. 9 is a sectional view taken upon the line 9—9 of Fig. 6, looking in the direction of the arrows; and Fig. 10 is a sectional view taken upon the line 10—10 of Fig. 8, looking in the direction of the arrows.

Figure 7:
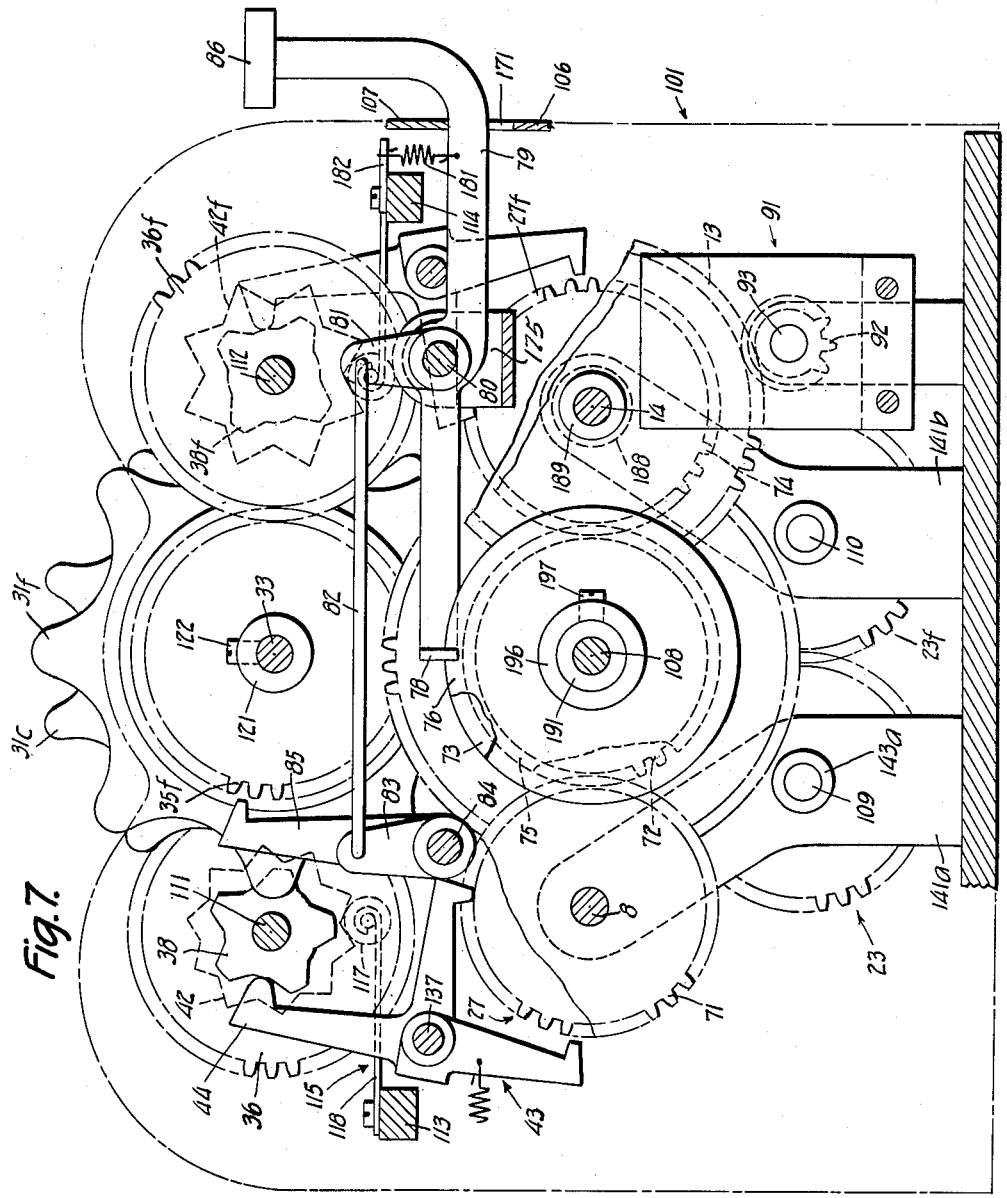
Fig. 7 is a sectional view taken upon the line 7—7 of Fig. 6 looking in the direction of the arrows.

The principle of operation of the illustrative apparatus is clearly indicated in the diagrammatic showing of Figs. 1 and 2. The invention will first be described and explained by reference to those figures, therefore, and the other figures will be subsequently referred to for the disclosure of structural features and details.

In Figs. 1 and 2, a scale 1 is shown which comprises a frame 2, a weighing platform 3, internal gearing (not shown), a movable weight indicating pointer 4, and a weight indicating dial 5. The platform 3 is connected in any suitable manner to drive a shaft 6, which constitutes a multiplier input member of price computing mechanism to be described. The multiplier input shaft 6 transmits its motion through a multiplying gear box 7 to a shaft 8. If desired, the box 7 may also include servo mechanism, but since servo mechanism is not essential to the operability of the apparatus, none has been illustrated.

The illustrative scale may be assumed to have a capacity of ten pounds and to produce an output per pound equal to eight revolutions of the shaft 8, so that the shaft 8 can be rotated through a maximum of eighty complete turns.

The shaft 8 is the sole driver for all of the multiplying mechanism to be described. It serves directly as the input shaft for a dimes unit 9 of the multiplying mechanism. It also serves through gears 10, 11, 12 and 13 to drive at a speed constantly equal to one-tenth of its own speed, an input shaft 14 of a cents unit 15. The shaft 8 also drives through gears 16, 17, 18 and 19, the input shaft 20 of a dollars unit 21. The drive ratio from the shaft 8 to the shaft 20 is so chosen that eight turns of the shaft 8 are required to produce five turns of the shaft 20. The reason for this stepdown ratio from the dimes input shaft to the dollars input shaft will be made clear at a subsequent point.

In addition to the cents unit 15 which is driven from the shaft 14, a fractions unit 22 is also provided and directly driven from the shaft 14.

The cents unit 15 and the dimes unit 9 are duplicates of one another, and hence a description of the dimes unit will serve for both.

The dimes unit comprises four computing differential gears 23, 24, 25 and 26. Each of these differential gears comprises a spider which carries pairs of intermeshing and partly overlapping planet gears and two internal gears of equal diameters, each of which is in mesh with one of the planet gears of each intermeshing pair. One internal gear of each differential is provided also with external teeth while the other one is not. In the diagram the indicated feed lines when drawn to and from the center of the differential symbol indicate respectively feed into and out of the spider of the differential. The feed lines when drawn to and from the circumference of a differential symbol indicate respectively input to and output from one of the internal gears.

The following rules of multiplication and direction of movement apply to differential gears of the kind employed. When the input is exclusively to one of the internal gears and the output is exclusively from the spider, the output is in the same direction as the input, but is one-half as great in extent. When the input is exclusively to the spider of one of the differential gears and the output is exclusively from one of the internal gears, the output is in the same direction as the input and is twice as great as the input. When the input is exclusively to one of the internal gears of a differential and the output is exclusively from the other internal gear, the output is equal to the input in magnitude, but opposite in direction.

It will be observed that the spider of differential gear 23 is connected to feed into one of the internal gears of the differential 24, that the spider of differential 24 is connected to feed into one of the internal gears of the differential 25, and that the spider of differential 25 is connected to feed into one of the internal gears of the differential 26. This series connection of the differential gears is invariably maintained. The internal gears of differentials 24, 25 and 26 referred to are to be considered as secondary input gears of their respective differentials because they receive input from another differential gear of the same series and not directly from the input shaft 8. One of the internal gears of differential 23 which constitutes the theoretical secondary input gear of that differential is, in fact, constantly locked because there is no differential gear lower in the series to feed into it.

The differential gears 23, 24, 25 and 26 include parallel driving connections from the shaft 8 which are adapted to be rendered effective or ineffective as desired. The shaft 8 has mounted upon it coupling differential gears 27, 28, 29 and 30. These latter differential gears are identical in construction with the differential gears 23, 24, 25 and 26, save that whereas the internal gears forming the secondary inputs of the differentials 23, 24, 25 and 26 are not provided with external teeth, both internal gears of each of the differentials 27, 28, 29 and 30 are provided with external teeth. While the differentials 27, 28, 29 and 30 are thus almost the same in construction as the differentials 23, 24, 25 and 26, their function is quite different, the purpose of the differentials 27, 28, 29 and 30 being to control the coupling and uncoupling of the primary input gears of the respective differentials 23, 24, 25 and 26 with respect to the input shaft 8. The differentials 23 to 26 will, therefore, be referred to as computing differentials, while the differentials 27, 28, 29 and 30 will be referred to as coupling differentials.

All of the coupling differentials are mounted upon the shaft 8 and have their spiders made fast to the shaft. Input to each of the coupling differentials is, therefore, through the differential spider, and such an input occurs whenever the shaft 8 is rotated. The output of a coupling differential may be through either of its internal gears.

One of the internal gears of each coupling differential is constantly in mesh with the external teeth of the primary input gear of the associated computing differential and constitutes a transmitting gear, while the other internal gear of the coupling differential drives nothing and is merely a waste gear.

Provision is made for locking the transmitting and waste gears of each coupling differential alternatively. That is to say, as one internal gear of the differential is locked, the other is unlocked so that it may rotate. When the waste gear of a coupling differential is locked, therefore, all of the input to the coupling gear spider is transmitted to the primary input gear of the associated computing differential, and when the transmitting gear of the coupling differential is locked, all of the input to the spider of that differential is wasted through the waste gear, and the primary input gear of the associated computing differential is locked by reason of its meshing relation with the now locked transmitting gear of the coupling differential.

From what has been said concerning the laws of transmission of input of the differentials employed, it will be evident that because the input of coupling differential 27 is to the spider and output is from one of the internal gears, eight turns (one pound) input of the shaft 8 will be transmitted as sixteen turns to the primary input gear of differential 23.

Because input to the computing differential 23 is through an internal gear and output is from the spider, these sixteen turns will be transmitted as eight turns of spider output to the secondary input gear of differential 24. The differential 24 will divide the eight turns of input to four turns of spider output, the differential 25 will divide the four turns of input to two turns of spider output, and the differential 26 will divide the two turns of input to one turn of spider output. In other words, the input is cut in half by each computing differential gear passed through.

The same eight turns of input of the shaft 8 if transmitted exclusively through the coupling gear 28, would produce two turns in the output of differential 26 because the input would pass through one less computing differential. Similarly, the same input through coupling differential 29 would produce four turns of output, and the same input through coupling differential 30 would produce eight turns of output. It will thus be seen that the four computing differentials 23, 24, 25 and 26 have relative output weights, respectively, of 1, 2, 4 and 8, these weights forming a geometrical series whose common ratio is two.

It is well known that by effecting all of the available combinations of these four digits and zero, using each of them in a given combination not more than once, all of the integers from zero to fifteen can be obtained. Since the dimes unit is a decimal unit, however, we are only concerned with the digits from zero to nine. The combinations for obtaining these digits are as follows:

| Decimal Digit | Binary Number Combination | | | |
|---|---|---|---|---|
| | (8) | (4) | (2) | (1) |
| 0 | | | | |
| 1 | | | | x |
| 2 | | | x | |
| 3 | | | x | x |
| 4 | | x | | |
| 5 | | x | | x |
| 6 | | x | x | |
| 7 | | x | x | x |
| 8 | x | | | |
| 9 | x | | | x |

For each decimal denomination unit there is provided a separate and independently operable decimal digit selector. In the case of the dimes digit selector, provision is made of an operating finger wheel 31 having ten equally spaced finger notches formed in its periphery. The finger wheel 31 is fast upon a hollow shaft 32, which shaft is revolubly mounted upon a stationary shaft 33. A dial wheel 34 having numerals from zero to nine arranged in order and at equal intervals upon its periphery is also fast upon the hollow shaft 32. The hollow shaft 32 also has fast with it a gear 35 which through an equal gear 36, drives the selector shaft 37 of the dimes unit. The shaft 37 has fast upon it four cams 38, 39, 40 and 41, and a detent wheel 42. The detent wheel is formed with ten notches corresponding to the ten positions in which it is desired that the shaft 37 may be arrested.

As the parts are shown in Fig. 2, the symbol zero of the dial wheel 34 is assumed to be in the indicated or effective position, and hence the output-input ratio of the dimes unit should be zero. Each of the cams controls a three-armed lever 43 which in turn controls the locking and unlocking of the transmitting and waste gears of the associated coupling differential. The arm 44 rides the cam, while the arm 45 is adapted to be moved into and out of engagement with the transmitting gear, and the arm 46 is adapted to be moved into and out of engagement with the waste gear. All of the cams 38, 39, 40 and 41 are shown in Fig. 2 in their zero positions, so that the several levers 43 are drawn clockwise by associated springs 47 into position to lock the associated transmitting gears.

It will be observed from the table given above, that the computing gear 23 having a relative weight of 1 should be idle at 0, active at 1, idle at 2, active at 3 and so on in alternation throughout the ten steps of the selector shaft 37. The cam 39 which controls the computing differential 24 having a relative weight of 2 should cause the primary input of the differential gear to be idle for 0 and 1, active for 2 and 3, idle for 4 and 5, active for 6 and 7, and idle for 8 and 9. The cam 40 which controls differential 29 having a relative weight of 4 should cause the primary input gear of the differential to be idle for 0, 1, 2 and 3, active for 4, 5, 6 and 7 and idle for 8 and 9. The cam 41 which controls the computing differential 26 having a relative weight of eight should cause the primary input gear of the differential to be idle for 0 through 7 and active for 8 and 9.

The cams as constructed are adapted to select the indicated digital drive ratios in direct or inverse numerical order according to the direction of rotation of the selector operating wheel 31. With the construction shown, it is not essential that the selector wheel 31 be operated in any specified direction, but it is permissible to set up the desired decimal digit drive ratio in the unit by moving the wheel 31 so as to bring up the desired digit on the dial wheel 34 by the shortest possible path, even though the movement involves operation of the wheel through the step from zero to 9, or from 9 to 0.

As has been pointed out, the cents unit 15 is essentially a duplicate of the dimes unit 9. There are only two differences between these two units. One such difference resides in the fact that the input shaft 14 is driven at one-tenth the rate of the input shaft 8. The other difference resides in the fact that the computing differentials of the fractions unit feed directly into the secondary input gear of computing differential 23c. In view of the correspondence of structure and of principle of operation, corresponding reference numerals have been applied to corresponding parts of the cents unit 15 and to the selector mechanism therefor with the subscript "c" added in each instance.

The fractions unit 22 comprises two coupling differentials 27f and 28f, like the differentials 27 and 28, whose spiders are fast upon the cents input shaft 14. The differentials 27f and 28f control the coupling of the primary input gears of computing differentials 23f and 24f to shaft 14. The differential 23f has its "secondary input" always locked, and its spider connected to drive the secondary input of differential 24f. The spider of differential 24f drives the secondary input of differential 23c. From the explanation of principle given in connection with the dimes unit it will be evident that for equal primary inputs differential 24f has one-half the weight of differential 23c and differential 23f has one-half the weight of differential 24f. The input rates of 24f and 23f correspond respectively to one-half cent per pound and one quarter cent per pound.

In the illustartive machine a price rate per pound in excess of $1.99 ¾ is not made available. It is evident, of course, that by altering the relative rates of rotation of the shafts 8 and 20, and providing a complete dollars unit similar to the dimes unit and the cents unit, a maximum rate of $9.99 ¾ could be made available, and that the principle could be still further extended by providing additional decimal denomination units. For illustrative purposes, a relatively simple but practical machine is shown in which the input through the dollar denomination unit must be either 1 or 0.

The dollar denomination unit comprises a coupling differential 51 similar to the other coupling differentials which have been described. The spider of the differential 51 is constantly driven by the shaft 20, and the transmitting output gear is constantly in mesh with the primary input gear of computing differential 52.

It will be remembered that the eight turns of shaft 8 which were considered for illustrative purposes, when transmitted through the differential 23 came out as one turn in the final output of the dimes unit and when transmitted through the differential 23c as one-tenth turn in the final output of the cents unit. The same eight turn input of the dimes unit, transformed to five turns by the gears 16, 17, 18 and 19, is multiplied to ten turns by the coupling differential 51. Thus the relative weight of one dollar and one dime at the input to the computing differentials 52 and 23 bear the ratio of ten to one as they should and the inputs are in the same direction.

The output of one cent from the differential gear 26c is also in the same direction and one-tenth as great in amount as the one dime output of differential gear 26.

The inputs from differential gears 26 and 51 are additively combined and, for the moment, cut in half by the computing differential gear 52, the combined output being transmitted from the spider of the differential gear 52. The output of differential gear 52 is combined with the cents output of differential gear 26c by the differential gear 53 which is coaxial with the differential 26c. The output from the spider of differential 26c is transmitted to one of the internal gears of the differential 53, while the output from the spider of differential 52 is transmitted to the spider of differential 53. The spiders of gears 52 and 53 are directly gear coupled to one another, and hence a reversal of direction of output is introduced at this point. Since, however, the input to differential 53 from differential 26c is to one of the internal gears and the output is from the other, a reversal of the cents input also occurs. Since all of the inputs to gear 53 are reversed, therefore, the absolute value of the output is the same as if no reversal had occurred and the outputs are additively combined.

The point mentioned that the inputs to gear 52 are cut in half by that gear requires to be noticed. This division of the combined inputs is immediately compensated by the fact that the input from differential 52 to differential 53 goes into the spider of gear 53 and comes out through one of the planet gears. This input is, therefore, multiplied by 2. The several inputs from the dollars, dimes and cents units are, therefore, combined additively and with the proper relative weight accorded to each.

The output from differential gear 53 is transmitted into a counter 54 which exhibits the product in dollars and cents.

A selector similar to the dimes digits selector is provided for the dollar denomination. This selector comprises a ten notch finger wheel 55 fast on a hollow shaft 56. The shaft 56 also has fast upon it a gear 57, the purpose of which will be explained a little farther on.

The shaft 56 is connected through equal gears 58 and 59 to drive a selector shaft 60. The shaft 60 is provided with a ten notch detent wheel 61 and carries a selector cam 62 which is the same in construction as the cam 38 of the dimes digit selector. The cam 62 causes the transmitting gear of differential 51 to be rendered inactive and active at alternate steps throughout the complete cycle of the cam 62. The cam controls a three-armed lever 63 which is similar in all respects to the three-armed levers 43 which have been described, and which cooperates with the transmitting and waste gears of coupling differential 51 just as the levers 43 cooperate with the transmitting and waste gears of the coupling differentials with which they are associated. A dial wheel 64 fast on the shaft 56 has the numerals 0 and 1 arranged in regular alternation throughout the ten steps of the selector.

An independently settable selector similar to the dimes digit selector is provided for the fractions unit. The selector comprises an eight notch finger wheel 31f fast on a hollow shaft 32f. The shaft 32f also has fast upon it a number wheel having eight number spaces. The series 0, ¼, ½, ¾ occurs on one half of the wheel and is repeated on the other half. The shaft 32f through equal gears 35f and 36f drives a cam shaft 37f upon which selector cams 38f and 39f and an eight notch detent wheel 42f are made fast. The cam 38f is formed to render computing differential 23f inactive and active alternately throughout its eight steps. The cam 39f is constructed to render the primary input of computing differential 24f inactive for zero and ⅛ and active for ¼ and ¾.

In order that the price output counter may at all times accurately exhibit the product of the quantity input by the rate, it is important that the multiplicand setting selectors be not disturbed in their settings at any time, save when the quantity input is zero.

In order to assure a harmonious relationship of the price indicator and the quantity indicator, provision is made of interlocking mechanism for locking the quantity input train at zero until the multiplicand selectors have been set, said locking mechanism being arranged when released to lock all of the multiplicand selectors against operation until the pointer of the input mechanism has been restored to the zero position. For securing this kind of result, it is important that locking members driven by the input train be provided which are adapted to be locked in the zero position and no other.

For this purpose, the shaft 8 is connected through equal gears 71 and 72 (Fig. 1) to drive a notched disk 73, and the shaft 14 is connected through gears 74 and 75 to drive a notched disk 76. The ratios of the gears 74 and 75 are such that the disk 76 is caused to make 33 revolutions for each 32 revolutions of the shaft 14 and for each 320 revolutions, therefore, of the shaft 8. The disks 73 and 76 are coaxially mounted upon a shaft 77 and their notches are in alignment when the shaft 8 is in its zero position. A locking bar 78 carried by a lever 79 is adapted to enter the aligned notches of the two disks when the shaft 8 is in its zero position, and by locking the disks against rotation to lock the shaft 8 and all the mechanism driven by the shaft 8 against rotation.

The lever 79 is made fast upon a rock shaft 80, which also has a crank 81 fast upon it. The crank 81 is connected through a link 82 to a crank 83 which is fast upon a shaft 84. The shaft 84 has fast upon it hooked locking arms 85 for locking the several selectors against operation. One of the arms 85 cooperates with the gear wheel 57 on the dollar selector shaft 56. One cooperates with the gear 35 on the dimes selector shaft 32, one cooperates with the gear 35c on the cents selector shaft 32c, and one cooperates with the gear 35f on the fractions selector shaft 32f.

When the bar 78 enters the notches of the disks 73 and 76, the shaft 84 is rocked to carry the locking arms 85 away from the gears referred to and to leave the several selectors free for operation. When the desired multiplicand has been set up by the selectors, a key 86 carried by the lever 79 is depressed to withdraw the bar 78 from the notches of the disks 73 and 76, so that the shaft 8 may turn. If at the time when the key 86 is depressed a weight is placed upon the scale, the shaft 8 will immediately turn and the notches of the disks will become disaligned so that the locking bar cannot reenter them. At the same time the shaft 84 is rocked into position to cause all of the selectors to be locked. It will be remembered that the disks 73 and 76 turn in the ratio of 320 to 33. Since these numbers have no common factors, the disk notches could not again be aligned away from the zero position and in position to be entered by the bar 78 until the completion of 320 turns of the shaft 8.

In order to assure that such an undesired operation shall not occur, provision is made of limit stop mechanism which is diagrammatically indicated at 91 in Fig. 1. The gear 13 on the shaft 14 acts through a gear 92 to drive the shaft 93. The shaft 93 enters a casing 94 and has fixed upon it within the casing a screw 95. The screw 95 drives a nut 96. The nut 96 is formed with a notch 97 which embraces a stationary rod 98. A collar 99 is adjustably secured by means of a set screw 100 upon the rod 98 and serves as a limit stop for the nut 97. As has been previously indicated, the intended limit of the illustrative machine is ten pounds or eighty turns of the shaft 8, a limit far within the prescribed 320 turns imposed by the characteristics of the notched disks 73 and 76 and the driving mechanism of the disks.

The actual physical construction and arrangement of the parts is illustrated in Figs. 3 to 10 inclusive.

All of the mechanism except the scale 1, the gear box 7 and the price indicating counter 54 are mounted within a casing 101 (Figs. 6, 7, 8, 9 and 10) which comprises a base member 102, opposite end walls 103 and 104, front and back walls 105 and 106, and a cover 107. The end walls 103 and 104 extend above the front and back walls, and the cover is made to conform in cross-sectional shape to the edge contour of the end walls as illustrated in Fig. 10.

The end walls 103 and 104 are connected to one another through a central stationary shaft 108 (see particularly Fig. 9) and by various other stationary shafts and bars. These shafts include stationary shafts 109 and 110 upon which the computing differentials are supported, stationary shafts 111 and 112 upon which hollow cam shafts of the selectors are mounted, stationary shafts 134 and 137 upon which the bell cranks 43, 43c, 43f and 63 are mounted and stationary shaft 33 upon which the selector wheels are mounted. Rotary shafts 8 and 14 extend between the end plates 103 and 104 and are jointly supported by the end plates.

The shaft 33 upon which the selector wheels 31f, 31c, 31 and 35 are revolubly supported, is carried by the end plates in the upper, central portion of the casing so that the selector wheels referred to are made to project upward through slots formed in the cover 107 into position to be engaged and conveniently operated by the clerk. The cover 107 is also formed with sight openings or windows through which the number wheels 34f, 34c, 34 and 64 can be conveniently read.

The shafts 8 and 14 are located at the same level as shaft 108 and at opposite sides of it, while the shafts 109 and 110 are located at a lower level and nearer to one another than the shafts 8 and 14.

The end walls 103 and 104 are also connected to one another through rigid bars 113 and 114. The bar 113 supports spring detents 115 and 116 which cooperate respectively with the detent wheel 42 (Figs. 6 and 9) and with the detent wheel 61 (Figs. 6 and 10). Each detent comprises a roller 117 which has one end of a leaf spring 118 wrapped part way around it. The opposite end of the leaf spring is secured to the bar 113 by a headed screw 119. Similar spring detents are carried by the bar 114 for cooperating, respectively, with the detent wheels 42f and 42c.

As best seen in Fig. 6, the fractions selector unit comprising the finger wheel 31f, the number wheel 34f, and the gear 35f is a unitary structure which is rotatably mounted upon the shaft 33 and which is limited in its movement toward the right as seen in Fig. 6 by a collar 121, the collar being secured to the shaft 33 by a set screw 122. The cents, dimes and dollar selector units are similarly constructed and are mounted for independent rotation upon the shaft 33. Spacer collars or sleeves 123 are provided upon the shaft 33 between the successive units.

The dollar selector unit which comprises the finger wheel 55, the number wheel 64 and the gear 57 has unitary with it the sleeve 56 and the sleeve, in turn, has fast upon it the gear 58. A collar 124 is secured to the shaft 33 by a set screw 125 in position to engage the lefthand face of the gear 58 as seen in Fig. 6. It will be seen that the collars 121 and 124 together with the spacer collars 123 and the selector units themselves serve to determine and maintain the desired positions of the units longitudinally of the shaft 33.

The fractions cam shaft 37f is a hollow sleeve which is revolubly mounted upon the stationary shaft 111. The shaft 37f has unitary with it the ratchet wheel 42f and cams 38f and 39f, as well as the gear 36f. The shaft 37f is secured against axial movement by collars 126 which are attached to the shaft 111 by set screws 127 at opposite ends of the shaft 37f.

The shaft 37c is also a hollow shaft which has unitary with it the gear 36c, the detent wheel 42c and the cams 38c, 39c, 40c and 41c. It is held against longitudinal movement on the shaft 111 between collars 128 which are secured to the shaft 111 by set screws 129.

The shaft 37 is also a hollow shaft which is revolubly mounted upon stationary shaft 112. The shaft 37 has unitary with it the gear 36, the detent wheel 42, and the cams 38, 39, 40 and 41. The shaft 37 is held against axial movement on the shaft 112 between collars 130 which are secured to the shaft 112 by set screws 131.

The shaft 60 is also a hollow shaft which has unitary with it the gear 59, the ratchet wheel 61 and the cam 62. The shaft 60 is held against axial movement on the shaft 112 between collars 132 which are secured to the shaft 112 by set screws 133.

The bell-cranks 43f and 43c are rockably mounted upon a stationary shaft 134 which connects the end walls 103 and 104 together. Each bell-crank is retained in its assigned position longitudinally of the shaft 134 between collars 135 which are secured to the shaft by set screws 136.

The bell cranks 43 and 63 are similarly mounted upon a stationary shaft 137 which extend between the end walls 103 and 104 of the casing. Each bell-crank is held in its assigned position longitudinally of the shaft between collars 138 which are secured to the shaft by set screws 139.

The bell-cranks 43, 43c, 43f and 63 are all alike in construction. Each bell-crank is formed from a blank of sheet metal.

In the case of the bell crank 63, for example (see Fig. 10), the arms 141 and 142, are made to lie in a common plane, but the metal which is in part to constitute the arm 143 is folded to offset the arm 143. By this construction the arms 142 and 143 are located to cooperate respectively with the external teeth of the transmitting and waste gears of the associated coupling differential, and at the same time a broad and stable bearing area is provided for the bell-crank.

The construction of the coupling differentials 27 and 28 and the computing differentials 23 and 24, which is characteristic of all the units employing multiple computing differentials, is illustrated in Fig. 3. A stationary frame plate 141a (Fig. 3) has affixed to it sleeve bearings 142a and 143a through which the shafts 8 and 109 are passed. The waste gear 144 of coupling differential 27 is rotatably mounted upon the bearing member 142a. The hub 145 of the spider 146 bears against the left hand end of the bearing member 142a, and includes a leftward sleeve extension 147 upon which the transmitting gear 148 of differential 27 and the waste gear 144 of differential 28 are rotatably mounted. The spider of the differential gear 28 is of the same construction as the spider of the differential gear 27, and the hub of the former bears against the extension 147 of the latter. The leftward extension 147 of the spider of differential 28 rotatably supports the transmitting gear 148 of the differential 28 and the waste gear (not shown) of the differential 29. Each spider hub of the dimes unit is made fast upon the shaft 8 by means of a pin 151.

Since all of the coupling differentials are alike in construction, the description of the differential 27 will suffice for all of them.

The gears 144 and 148 are provided respectively with internal teeth 152 and 153. The gears 144 and 148 are also provided respectively with external teeth 154 and 155.

Each spider 146 includes a hub portion 145 as already described and a pair of parallel plates or disks 156 which are secured upon the hub. The plates 156 are secured to one another through six bearing pins 157, the pins being shouldered to control the spacing between the plates 156 and having their ends reduced, passed through the plates, and upset. The pins 157 are arranged in pairs to support meshing and partly overlapped planet gears 159 and 160. Each planet gear includes a spacer extension 161 to preclude endwise play of the gear upon its bearing pin. While the paired gears 159 and 160 are in mesh with one another, only the lefthand gears 159 mesh with the internal teeth 153 of the gear 148 and only the righthand gears 160 mesh with the internal teeth 152 of the gear 144.

As has been previously pointed out, either the waste gear 144 or the transmitting gear 148 of a coupling differential may be locked to cause the entire input supplied to the coupling differential through its spider to be transmitted to the unlocked internal gears of the differential. The computing differential gears 23 and 24, and in fact all of the coupling and computing differential gears employed in the machine, are the same in construction as the gear 27 which has been described, except that the secondary input gears of the computing differentials have no external teeth.

The transmitting gear 148 of the coupling differential 27 is connected through its external teeth 155 and external teeth 162 of primary input gear 163 of computing differential 23, to drive or to lock the latter gear according to the condition of the gear 148. Since the internal gear 164 of differential 23 has no external teeth for meshing with the teeth 154 of the waste gear 144, the latter gear is obviously not effective to drive or to lock the gear 164. Since the differential 23 is the first computing differential of the dimes group, there is never any input through the gear 164. The gear 164 is, therefore, secured permanently against rotation by means of a key 165 which connects it to the stationary bearing member 143.

The output of the differential 23 is through the extension 147 of the spider hub. The extension 147 is connected through a key 166 to drive the secondary input gear 164 of the computing differential 24. The dimes unit, as has already been explained, includes four coupling differentials and four computing differentials. Only two differentials of each class have been illustrated and described, however, since further illustration and description would be simply repetitive.

The differentials of the cents unit are like those of the dimes unit save that the secondary input of the first computing differential of the cents unit is not locked but is driven from the fractions unit.

The fractions unit is like the dimes unit, save that the fractions unit comprises only two coupling differentials and two computing differentials. The secondary input gear of the first computing differential of the fractions unit is permanently locked against rotation, being made fast with a supporting bracket 141b. The dollars unit is also similar but in the illustrative machine comprises only a single coupling differential and a single computing differential. The secondary input gear of the latter differential is driven from the dimes unit.

The construction of the interlocking mechanism and the mounting of the limit mechanism are illustrated at the righthand end of Fig. 6 and in Figs. 7 and 9. The lever 79 extends through a slot 171 which is formed in the upper margin of the rear wall 106 of the casing. The rear wall is assumed to be the one toward the store clerk, so that the mechanism faces the customer. The lever 79 is secured to shaft 80, by a set screw 173 in a hub 174 of the lever. The shaft 80 is rockably supported at one end by the end wall 104 of the casing, and at the other end in a bracket 175 which is supported from the same end wall. The crank 81 is made fast upon the shaft 80, to rock in unison with lever 79, by means of a set screw 176 which is threaded through hub 177 of the crank into engagement with the shaft 80.

The link 82 is shown in Fig. 6 connecting the crank 81 on the shaft 80 to the crank 83 on the shaft 84. The crank 83 is made fast upon the shaft 84 by means of a set screw 178 which is threaded through the hub 179 of the crank 83 into engagement with the shaft. The locking arks 85 for the several selectors are made fast upon the rock shaft 84 by means of set screws 180. The lever 79 is normally held upward by a tension spring 181 which is connected at one end to the lever and at the other to a stationary pin 182 which is affixed to the bar 114.

The limit stop housing 94 is secured upon the end wall 104 of the casing 101. The shaft 93 extends leftward from the casing 94 and is rotatably supported in the vertical web of a stationary bracket 183, the bracket being affixed to the base 102 of the housing 101. The gear 92, which is driven by the gear 13, has its hub affixed to the shaft 93 by means of a set screw 184.

It will be seen in Fig. 6 that the gears 11 and 12 are connected to one another by a sleeve 185, the unit being rotatably mounted upon the shaft 108 and held against axial shifting between collars 186 which are secured to the shaft by set screws 187 (only one of the collars 186 being shown). The gears 13 and 74 are connected through a sleeve 188, to form a unit to rotate freely on the shaft 14. This unit is held in place, axially of the shaft 14, by means of collars 189 which are secured to the shaft 14.

The gear 71 is made fast upon the shaft 8 by means of a set screw 190, which is threaded through the hub of the gear 71 into engagement with the shaft.

The gear 72, driven by the gear 71 is made unitary with a sleeve 191 which is rotatably mounted upon the shaft 108. The sleeve 191 has a reduced portion which extends over to the right hand end wall 104 of the casing 101.

A collar 192, secured upon shaft 108 by a set screw 193, bears against the gear 72 and prevents movement of the gear and the sleeve 191 toward the left. A unit consisting of the gear 75, the disk 73 and a connecting sleeve 194 is mounted upon the reduced portion of the sleeve 191 to bear against the shoulder thereof. A spacing sleeve 195 is mounted upon the reduced portion of the sleeve 194 between the disks 173 and 176. The disk 76 is provided with a hub 196 which is secured to the sleeve 191 by means of a set screw 197.

In Fig. 8 the connections are illustrated for combining the outputs of the cents, dimes and dollar units and transmitting them to the price indicating counter 54. The spider of computing differential 26c is connected through a spacing sleeve 201 to transmit the drive to the internal gear 164 of differential 53.

The spider of the dimes computing gear 26 is similarly connected through a spacing sleeve 202 to transmit drive to the secondary input gear 164 of computing differential 52. As will be seen, the gear 16 is secured upon a hub extension of the spider of differential 30 by means of a set screw 202a which is threaded through the gear hub into engagement with the spider hub. This merely causes the gear 16 to rotate in unison with the shaft 8. The gears 17 and 18 are made unitary with a connecting sleeve 203 which is revolubly mounted upon the shaft 108. The unit consisting of the gears 17 and 18 and the connecting collar 203 is held in its assigned position upon the shaft 108 by means of collars 204 which are secured to the shaft by set screws 205.

The gear 19 is secured upon hollow shaft 20 by means of a set screw 206 which is threaded through the hub of the gear into engagement with the collar shaft. The hollow shaft 20 is connected to drive the spider of coupling differential 51, the spider being mounted with freedom to rotate upon and relative to the shaft 8.

It will be remembered that the spider of computing differential 52 is gear-connected to drive the spider of differential 53. This drive is transmitted from the spider of computing differential 52 through the spider extensions 147 of the differential gears 52 and 53. The connection is effected through meshing gears 207 and 208, the former having its hub secured by a set screw 209 to the spider extension 147 of the differential 52, and the latter having its hub secured by a set screw 210 to the spider extension 147 of the differential gear 53.

The output from the differential gear 53 is through the internal gear 211 of the differential. The external teeth of the gear 211 mesh with and drive gear 212 which forms part of a unit revolubly mounted upon the shaft 108. The gear 212 and an equal gear 213 are made unitary with a sleeve 214 which is mounted on the shaft 108 and held toward the end wall 103 by means of a collar 215, the collar being secured to the shaft 108 by a set screw 216. The gear 213 drives a gear 217 which is fast upon the input shaft 218 of the counter 54.

The connection of the gear 217 to the shaft 218 is effected by means of a set screw 219 which is threaded through the hub of the gear 217 into engagement with the shaft. The shaft 218 is coaxial with the shaft 110 and is provided with a hollow bore 220 in which the left hand end of the shaft 110 is received and supported.

The housing of the counter 54 is secured exteriorly to the wall 103 of the casing 101, by means of screws 221.

It will be observed that the gears 207 and 208, shown as having the same diameters as the gears 163, mesh directly with one another. In order to avoid interference between the gears 163 which are supported on the shaft 109 and gears 163 which are supported upon the shaft 110, these gears are arranged in staggered relation to one another as illustrated with reference to the differentials 26 and 26c in Fig. 8.

We have described what we believe to be the best embodiments of our invention. We do not wish, however, to be confined to the embodiments shown but what we desire to cover by Letters Patent is set forth in the appended claims.

We claim:

1. In a multiplying machine, the combination with a single primary multiplier input member through which the entire multiplier is continuously run in and a single product output member, of a single selective gear transmission train between said members to transmit the input to the output member in any one of a multiplicity of selected ratios, said transmission train comprising a plurality of decimal denomination transmission units connected to have constant relative weights of 10 to 1, each of said units including an input shaft and an output shaft and a set of differentials interposed between the input and output shafts, each differential having a characteristic individual input value, said values within a portion at least of the decimal units forming the terms of a continuous geometrical series whose common ratio is 2, said differentials adapted to be coupled for input purposes either individually or in combination, means constantly connecting the input shaft of each decimal denomination unit to be driven from the primary input member in a fixed characteristic ratio, and multiplicand setting means including a separate and independent setting mechanism for each of said denomination units each disposed to act upon the differentials of a single decimal unit and each rotatable to change the connection between the input and output shafts of its associated decimal unit by successive increments of one digit in that denomination.

2. In a multiplying machine, the combination with a single primary multiplier input member through which the entire multiplier is continuously run in and a single product output member, of a single selective gear transmission train between said members to transmit the input to the output member in any one of a multiplicity of selected ratios, said transmission train comprising a plurality of decimal denomination transmission units connected to have constant relative weights of 10 to 1, each of said units including an input shaft and an output shaft and a set of differentials interposed between the input and output shafts, such differentials adapted to be connected in parallel to the unit input shaft and constantly connected in series to the output shaft, and each having a characteristic individual input value, said values forming terms of a continuous geometrical series whose common ratio is 2, said differentials adapted to be coupled for input purposes either individually or in combination, means constantly connecting the input shaft of each decimal denomination unit to be driven from the primary input member in a fixed characteristic ratio, and multiplicand setting means including a separate and independent setting mechanism for each of said denomination units each disposed to act upon the differentials of a single decimal unit and each rotatable to change the connection between the input and output shafts of its associated decimal unit by successive increments of one digit in that denomination.

3. In a multiplying machine, the combination with a single primary multiplier input member through which the entire multiplier is continuously run in and a single product output member, of a single selective gear transmission train between said members to transmit the input to the output member in any one of a multiplicity of selected ratios, said transmission train comprising a plurality of decimal denomination transmission units connected to have constant relative weights of 10 to 1, each of said units including an input shaft an an output shaft and a set of computing differentials interposed between the input and output shafts, each set of computing differentials adapted to be connected in parallel to the unit input shaft and constantly connected in series to the unit output shaft, means constantly connecting the input shaft of each decimal denomination unit to be driven from the primary input member in a fixed characteristic ratio, and multiplicand setting mechanism including an independent digit selector for each of said denomination units, each disposed to act upon the differentials of a single decimal unit and each rotatable to change the connection between the input and output shafts of its associated decimal unit by successive increments of one digit in that denomination.

4. In a multiplying machine, the combination with a single, primary multiplier input member through which the entire multiplier is continuously run in and a single product output member, of a single selective gear transmission train between said members to transmit the input to the output member in any one of a multiplicity of selected ratios, said transmission train comprising a plurality of decimal denomination transmission units connected to have constant relative weights of 10 to 1, each of said units including an input shaft and an output shaft and a set of computing differentials interposed between the input and output shafts, each set of differentials adapted to be connected to receive input in parallel from the input shaft or to be locked against receiving such input, and constantly connected in series to the output shaft, means constantly connecting the input shaft of each decimal denomination unit to be driven from the primary input member in a fixed characteristic ratio, and multiplicand setting mechanism including an independent digit selector for each of said denomination units, each disposed to act upon the differentials of a single decimal unit and each rotatable to change the connection between the input and output shafts of its associated decimal unit by successive increments of one digit in that denomination, each separate digit selector comprising cam and clutch mechanism operable independently of any other digit selector and constructed and arranged to change the digit settings in numerical order.

5. In a multiplying machine, the combination with a single primary multiplier input member through which the entire multiplier is continuously run in and a single product output member, of a single selective gear transmission train between said members to transmit the input to the output member in any one of a multiplicity of selected ratios, said transmission train comprising a multiplicity of computing differential gears each having an individual input value, said differential gears adapted to be coupled for input purposes either individually or in combination, and multiplicand setting mechanism operable to determine which differentials shall be rendered active and which inactive, said setting mechanism comprising a plurality of distinct and independently settable selectors each having a group of differentials under its individual control, and each comprising a manually operable input member, a series of cams operated thereby, and means operated by the cams for rendering the differentials of the controlled group active and inactive in a prescribed sequence which causes the multiplicand to be changed by uniform increments, each an integral multiple of the individual input of the group differential of lowest input value.

6. In a multiplying machine, the combination with a common multiplier input member and a single product output member, of a single selective gear transmission train between said members to transmit the input to the output member in any one of a multiplicity of selected ratios, said transmission train comprising a multiplicity of computing differential gears each having an individual input value, said differential gears being arranged to provide at least a units group, a tens group, and a fractions group, input and output shafts associated with the respective groups, means constantly connecting the common input member to drive each of said input shafts in a fixed, characteristic ratio to the common input member, and multiplicand setting mechanism operable to determine which differentials shall be rendered active and which inactive, said setting mechanism comprising distinct and independently settable selectors for the respective groups referred to, each comprising means for causing the differentials of the group controlled by it to be coupled to, and uncoupled from, the associated input shaft in a prescribed order.

7. In a computing scale, in combination, a load bearing member, a single multiplier input member operated thereby, a single product output member, a single selective gear transmission train between the multiplier input member and the product output member comprising binary system computing differentials arranged in decimal digit groups, the groups being arranged in parallel branches of said single transmission train, each of which includes an input shaft, an output shaft, means constantly connecting the single input member to drive each of said input shafts in a fixed, characteristic ratio to the single input member, and differential gearing combining the outputs of said groups for transmission to the single product output member, and a multiplicand setting mechanism comprising a separate and independently operable digit selector for each decimal digit group, each comprising means for causing the differentials of the group controlled by it to be coupled to, and uncoupled from, the associated input shaft in a prescribed order.

8. In a computing scale, in combination, a load bearing member, a multiplier indicator constantly connected for forward and reverse operation by said bearing member, a multiplier input member operated by the load-bearing member, a product output member, a product indicator constantly connected to be operated in forward and reverse direction by said product output member in conformity with the operation thereof, a selective transmission train invariably connecting the multiplier input member to operate the product output member forward and backward in one or another of a variety of selected ratios, said train comprising computing differentials arranged in decimal denomination groups, a multiplicand setting mechanism comprising a separate and independently operable digit selector and indicator for each decimal denomination, and interlocking mechanism responsive to the multiplier input member for locking said member in its zero position while leaving the multiplicand setting mechanism free to be operated, but effective at all other times to lock the multiplicand setting mechanism against operation while leaving the multiplier input member free to be operated.

9. In a multiplying machine, the combination with a multiplier input member, a multiplier indicator constantly connected for forward and reverse operation by said multiplier input member, a product output member, a product indicator constantly connected to be operated in forward and reverse direction by said product output member in conformity with the operation thereof, of a single selective gear transmission train between said members to transmit the input to the output in any one of a multiplicity of selected ratios, multiplicand setting mechanism, a locking mechanism for locking said mechanism against operation, and means operated by the multiplier input member, to maintain said locking mechanism always effective except when the multiplier input member, the multiplier indicator, and the product indicator are in the zero input position.

10. In a multiplying machine, the combination with a multiplier input member, a multiplier indicator constantly connected for forward and reverse operation by said multiplier input member, a product output member, a product indicator constantly connected to be operated in forward and reverse direction by said product output member in conformity with the operation thereof, of a selective transmission train between said members to transmit the input to the output in any one of a multiplicity of selected ratios, a limit stop for determining the maximum extent of operation of the input member, multiplicand setting mechanism, a common locking mechanism for maintaining said setting mechanism inoperable except when the multiplier input member, the multiplier indicator and the product indicator are in the zero input position, said mechanism comprising a bar and a plurality of notched disks rotatively driven by the multiplicand input member and engaged by the bar, the disk notches being aligned at the zero position of the multiplier input member to receive the bar and thereby to free the selectors, but the rates of drive of the disks being so incommensurably related that the notches are not again aligned in position to be entered by the bar within the capacity of the machine.

11. In a multiplying machine, the combination with a multiplier input member, a multiplier indicator constantly connected for forward and reverse operation by said multiplier input member, a product output member, a product indicator constantly connected to be operated in forward and reverse direction by said product output member in conformity with the operation thereof, of a selective transmission train between said members, multiplicand setting mechanism, a locking mechanism operable upon the multiplier input member to maintain it in zero position while the multiplicand setting mechanism is being set, but releasable when the desired multiplicand has been set up, said locking mechanism constructed and arranged to maintain the multiplicand setting mechanism locked against operation except when the multiplier input member, the multiplier indicator and the product indicator are in the zero position.

12. In a multiplying machine, the combination with a multiplier input member, a multiplier indicator constantly connected for forward and reverse operation by said multiplier input member, a product output member, a product indicator constantly connected to be operated in forward and reverse direction by said product output member in conformity with the operation thereof, a connecting train from the multiplier input member to the product output member and constantly controlling the position of the latter, and multiplicand setting mechanism operable to vary said train between multiplying operations, of interlocking mechanism controlled from the multiplier input member and operable alternatively upon the input member and upon the multiplicand setting mechanism to prevent operation of the setting mechanism when the multiplier input member is away from the zero position and to maintain the multiplier input member in the zero position while the multiplicand setting mechanism is being set, said interlocking mechanism comprising a plurality of notched disks driven by the multiplier input member, whose notches align in locking position only when the multiplier input member is in the zero position, a lever having a locking bar engageable with the notches when they are aligned in the locking position, and locking means for the multiplicand setting mechanism arranged to be held effective by the locking bar so long as the locking bar rides on the circumference of the disks, but to be released when the locking bar enters the notches of the disks.

13. In a computing scale, the combination with a load bearing member, a multiplier indicator constantly connected for forward and reverse operation by said bearing member, of a multiplier input member operable by the loadbearing member, a product output member, a product indicator constantly connected to be operated in forward and reverse direction by said product output member in conformity with the operation thereof, a selective transmission train interposed between said multiplier input and product output members, and constantly controlling the position of the latter from the former, multiplicand setting mechanism operable on said train, and interlocking mechanism constructed and arranged to retain the input multiplier member in zero position until the multiplicand has been set up, and to lock the multiplicand setting mechanism against further setting operation concomitantly with the freeing of the multiplier input member.

14. In a multiplying machine, the combination with a single, primary multiplier input member through which the entire multiplier is continuously run in and a single product output member, of a single, selective gear transmission train between said members to transmit the input to the output member in any one of a multiplicity of selected ratios, said transmission train comprising a plurality of decimal denomination transmission units connected to have constant relative weights of 10 to 1, each of said units including an input shaft and an output shaft and a set of computing differentials interposed between the input and output shafts, each set of differentials adapted to be connected to receive input in parallel from the input shaft or to be locked against receiving such input and constantly connected in series to the output shaft, means constantly connecting the input shaft of each decimal denomination unit to be driven from the primary input member in a fixed characteristic ratio, and multiplicand setting mechanism including an independent digit selector for each of said denomination units, each disposed to act upon the differentials of a single decimal unit and each rotatable to change the connection between the input and output shafts of its associated decimal unit by successive increments of one digit in that denomination, each separate digit selector comprising cam and clutch mechanism operable independently of any other digit selector and constructed and arranged to change the digit settings in numerical order, each digit selector also comprising a number bearing finger wheel, the finger wheels being arranged side by side in ascending denominational order from right to left for both setting and indicating the decimal digits of the multiplicand.

References Cited in the file of this patent
UNITED STATES PATENTS

| Number | Name | Date |
|---|---|---|
| 487,615 | Frazeur | Dec. 6, 1892 |
| 1,179,358 | Heuser | Apr. 11, 1916 |
| 1,190,377 | Church | July 11, 1916 |
| 1,297,599 | Shepard | Mar. 18, 1919 |
| 1,508,762 | Bacon | Sept. 16, 1924 |
| 1,967,559 | Schreck | July 24, 1934 |
| 2,106,686 | Woodford | Jan. 25, 1938 |
| 2,194,477 | Maxson et al. | Mar. 26, 1940 |
| 2,227,785 | Kottmann | Jan. 7, 1941 |
| 2,322,767 | McLaren | Jan. 29, 1943 |
| 2,397,970 | Malcher | Apr. 9, 1946 |